United States Patent
Perkins et al.

(10) Patent No.: US 7,320,243 B2
(45) Date of Patent: *Jan. 22, 2008

(54) METHODS AND APPARATUS FOR DETECTION OF LARGE LEAKS IN SEALED ARTICLES

(75) Inventors: Charles Perkins, Boston, MA (US); Pieter N. Palenstijn, Plympton, MA (US)

(73) Assignee: Varian, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/524,244

(22) PCT Filed: Jun. 9, 2004

(86) PCT No.: PCT/US2004/018413
§ 371 (c)(1),
(2), (4) Date: Feb. 10, 2005

(87) PCT Pub. No.: WO2004/111598
PCT Pub. Date: Dec. 23, 2004

(65) Prior Publication Data
US 2006/0156795 A1    Jul. 20, 2006

(51) Int. Cl.
*G01M 3/20* (2006.01)
(52) U.S. Cl. ..................................... 73/40.7
(58) Field of Classification Search ........... 73/40.7
See application file for complete search history.

(56) References Cited

U.S. PATENT DOCUMENTS

| | | | | |
|---|---|---|---|---|
| 3,280,619 A | * | 10/1966 | Spies | 73/40.7 |
| 3,591,827 A | * | 7/1971 | Hall | 315/108 |
| 4,918,975 A | * | 4/1990 | Voss | 73/40.7 |
| 5,325,708 A | * | 7/1994 | De Simon | 73/40.7 |
| 5,625,141 A | * | 4/1997 | Mahoney et al. | 73/40.7 |
| 5,661,229 A | | 8/1997 | Bohm et al. | |
| 6,014,892 A | * | 1/2000 | Baret et al. | 73/40.7 |
| 2005/0199042 A1 | * | 9/2005 | Perkins et al. | 73/40.7 |

FOREIGN PATENT DOCUMENTS

| | | |
|---|---|---|
| EP | 0352371 A2 * | 11/1988 |
| EP | 0 352 371 A2 | 1/1990 |
| EP | 0 632 258 A2 | 1/1995 |

* cited by examiner

*Primary Examiner*—Hezron Williams
*Assistant Examiner*—Paul M West
(74) *Attorney, Agent, or Firm*—William McClellan; Bella Fishman

(57) ABSTRACT

Methods and apparatus are provided for detection of large leaks in sealed articles. Apparatus for leak detection includes a first sealable chamber configured to receive a test piece containing a trace gas, a second sealable chamber, a first valve coupled between the first and second chambers, a leak detector having a test port, a trace gas permeable member coupled between the second chamber and the test port of the leak detector, a vacuum pump having an inlet, and a second valve coupled between the second chamber and the inlet of the vacuum pump. The permeable member may be quartz, which is permeable to helium when heated. The leak detector may be an ion pump or a helium mass spectrometer leak detector.

13 Claims, 6 Drawing Sheets

METHODS AND APPARATUS FOR DETECTION OF LARGE LEAKS IN SEALED ARTICLES

FIELD OF THE INVENTION

This invention relates to detection of leaks in sealed articles and, more particularly, to methods and apparatus for detection of large leaks in hermetically sealed articles with small internal volumes.

BACKGROUND OF THE INVENTION

Helium mass spectrometer leak detection is a well-known leak detection technique. Helium is used as a tracer gas which passes through the smallest of leaks in a sealed test piece. After passing through a leak, a test sample containing helium is drawn into a leak detection instrument and is measured. An important component of the instrument is a mass spectrometer tube which detects and measures the helium. The input test sample is ionized and mass analyzed by the spectrometer tube in order to separate the helium component. In one approach, a test piece is pressurized with helium. A sniffer probe connected to the test port of the leak detector is moved around the exterior of the test piece. Helium passes through leaks in the test piece, is drawn into the probe and is measured by the leak detector. In another approach, the interior of the test piece is coupled to the test port of the leak detector and is evacuated. Helium is sprayed onto the exterior of the test piece, is drawn inside through a leak and is measured by the leak detector.

One of the difficulties associated with helium mass spectrometer leak detection is that the inlet of the mass spectrometer tube must be maintained at a relatively low pressure, typically $2\times10^{-4}$ Torr. In a so-called conventional leak detector, the test port, which is connected to the test piece or to the sniffer probe, must be maintained at relatively low pressure. Thus, the vacuum pumping cycle is relatively long. Furthermore, in the testing of leaky or large volume parts, it may be difficult or impossible to reach the required pressure level. If the required pressure level can be reached, the pumping cycle is lengthy.

Techniques have been proposed in the prior art to overcome this difficulty. A counterflow leak detector disclosed in U.S. Pat. No. 3,690,151, issued Sep. 12, 1972 to Briggs, utilizes a technique of reverse flow of helium through a diffusion pump to the mass spectrometer. The leak detector test port can be operated at the pressure of the diffusion pump foreline. A similar approach utilizes reverse flow of helium through a turbomolecular pump. A technique for gross leak detection is disclosed in U.S. Pat. No. 4,735,084 issued Apr. 5, 1988 to Fruzzetti. The tracer gas is passed in reverse direction through one or two stages of a mechanical vacuum pump. These techniques have permitted the test port pressure to be higher than for conventional leak detectors. Nonetheless, reaching the higher test port pressure can be difficult when testing large volumes, dirty parts or parts with large leaks.

In conventional helium leak detection, where a large leak is present in a hermetically sealed small part, the helium can be pumped away so fast during the rough pump cycle that no leak reading is possible and the leaking part is accepted. This problem has existed in the industry for a long time. The following methods have been utilized for some applications with limited results: (1) measure the difference in evacuation time between a leaky part and a non-leaky part, and (2) a volumetric expansion method. Neither technique provides sufficient resolution. U.S. Pat. No. 5,625,141, issued Apr. 29, 1997 to Mahoney et al., discloses a helium mass spectrometer leak detector combined with a volume expansion technique for gross leak detection.

European Patent Application No. 0 352 371 published Jan. 31, 1990 discloses a helium leak detector including an ion pump connected to a probe in the form of a silica glass capillary tube. The silica glass tube is heated to a temperature between 300° C. and 900° C. and thereby becomes permeable to helium. U.S. Pat. No. 5,325,708 issued Jul. 5, 1994 to De Simon discloses a helium detecting unit using a quartz capillary membrane, a filament for heating the membrane and an ion pump. U.S. Pat. No. 5,661,229 issued Aug. 26, 1997 to Bohm et al. discloses a leak detector with a polymer or heated quartz window for selectively passing helium to a gas-consuming vacuum gauge.

All of the prior art helium leak detectors have had one or more drawbacks, including limited pressure ranges, susceptibility to contaminants and/or high cost. Accordingly, there is a need for improved methods and apparatus for leak detection.

SUMMARY OF THE INVENTION

According to a first aspect of the invention, apparatus for leak detection is provided. The apparatus comprises a first sealable chamber configured to receive a test piece containing a trace gas, a second sealable chamber, a first valve coupled between the first and second chambers, a leak detector having a test port, a trace gas permeable member coupled between the second chamber and the test port of the leak detector, a vacuum pump having an inlet, and a second valve coupled between the second chamber and the inlet of the vacuum pump.

The permeable member may be permeable to helium, and the trace gas permeability of the permeable member may be controllable. In some embodiments, the permeable member comprises a quartz member. The apparatus may further comprise a heating element in thermal contact with the quartz member and a controller configured to control the heating element.

According to a second aspect of the invention, apparatus for leak detection is provided. The apparatus comprises a first sealable chamber configured to receive a test piece containing a trace gas, a second sealable chamber, a first valve coupled between the first and second chambers, a leak detector including a test port and a vacuum pump, a second valve coupled between the second chamber and the test port of the leak detector, and a trace gas permeable member coupled between the second chamber and the test port of the leak detector.

According to a third aspect of the invention, a method for leak detection is provided. The method comprises providing a first sealable chamber, a second sealable chamber and a first valve coupled between the first and second chambers, placing a test piece containing a trace gas in the first chamber with the first valve closed, vacuum pumping the second chamber with the first valve closed, opening the first valve, wherein gas in the first chamber expands into the second chamber, providing a trace gas permeable member coupled to the second chamber, and detecting a leak in the test piece by sensing the trace gas that passed through the permeable member.

According to a fourth aspect of the invention, apparatus for leak detection is provided. The apparatus comprises a first sealable chamber configured to receive a test piece containing a trace gas, a second sealable chamber, a first valve coupled between the first and second chambers, a first leak detector including a test port and a vacuum pump, a second valve coupled between the second chamber and the test port of the first leak detector, a second leak detector having a test port, and a trace gas permeable member coupled between the second chamber and the test port of the second leak detector.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 1:
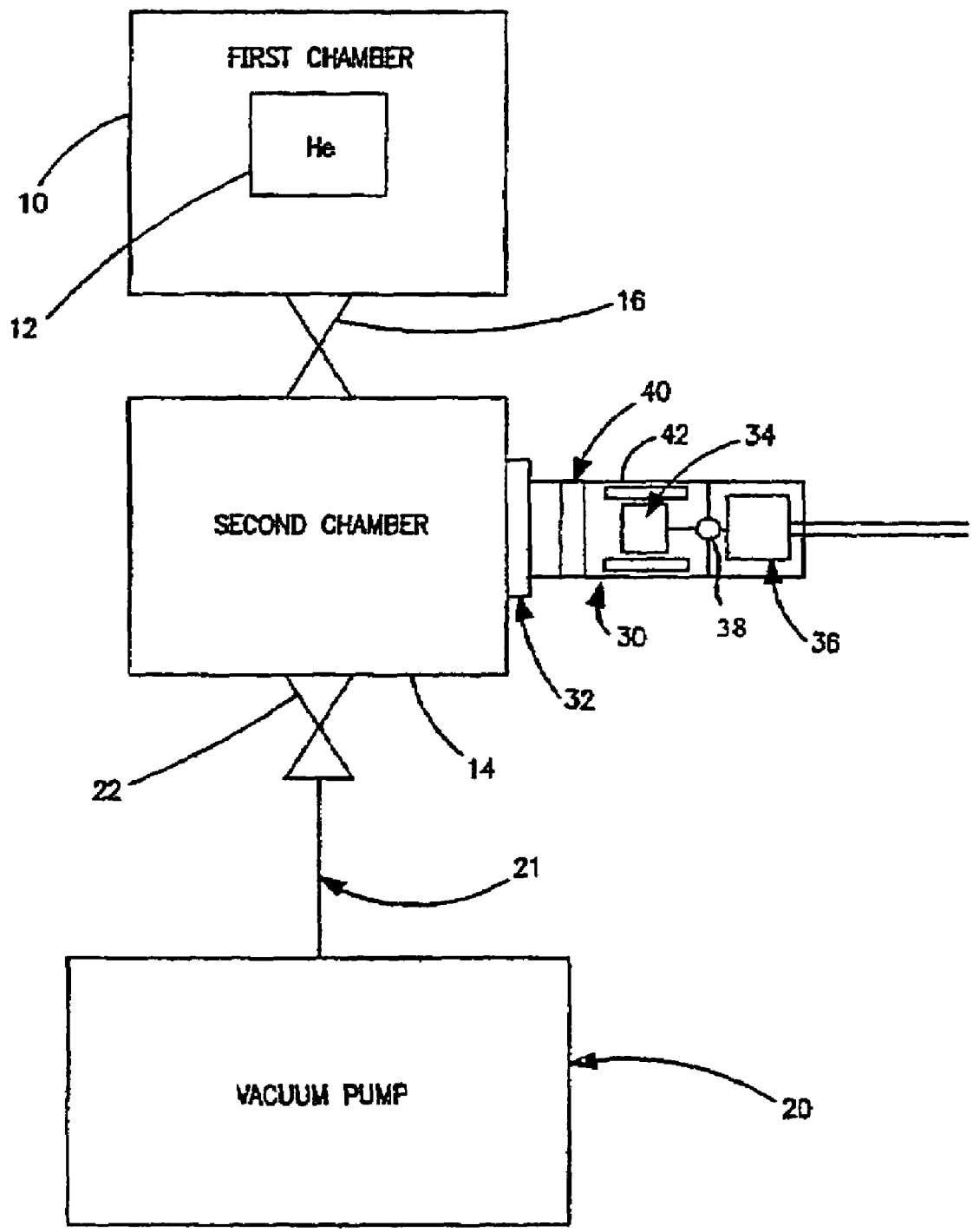
FIG. 1 is a schematic block diagram of leak detection apparatus in accordance with a first embodiment of the invention.

A schematic block diagram of leak detection apparatus in accordance with a first embodiment of the invention is shown in FIG. 1. A first sealable chamber 10 holds a test piece 12. The internal volume of test piece 12 is pressurized with helium or is exposed to a high helium concentration before being inserted into the first chamber 10 of the leak detection apparatus. A second sealable chamber 14 is connected to first chamber 10 through a first valve 16. A vacuum pump 20 having an inlet 21 is connected through a second valve 22 to second chamber 14. Vacuum pump 20 may be any type able to evacuate down to a pressure of about 100 millibar.

A helium detector assembly 30 is connected via a vacuum flange 32 to second chamber 14. Helium detector assembly 30 includes an ion pump 34, an ion pump controller 36 and a trace gas permeable member 40. Ion pump 34 and permeable member 40 are mounted in a sealed housing 42 with permeable member 40 interposed between second chamber 14 and ion pump 34. Controller 36 is connected to ion pump 34 via a vacuum feedthrough 38. Controller 36 supplies power to ion pump 34 and senses ion pump current.

Ion pump 34 is typically energized by a high voltage, between 2000 and 9000 volts, supplied by controller 36. The ion pump current is proportional to the vacuum pressure inside the ion pump. Helium that permeates through permeable member 40 affects the vacuum pressure at a rate that is proportional to the leak rate. The ion pump current is therefore proportional to the leak rate.

Trace gas permeable member 40 is located between second chamber 14 and ion pump 34. Permeable member 40 is a material that is permeable to the trace gas used in the leak detection apparatus, typically helium, under specified conditions. Permeable member 40 substantially passes, or permeates, the trace gas while substantially blocking other gases, liquids and particles. The permeable member 40 thus acts as a trace gas window in the sense of allowing the trace gas to pass while blocking other gases, liquids and particles. Permeable member 40 may have the shape of a disk, for example.

Figure 1A:
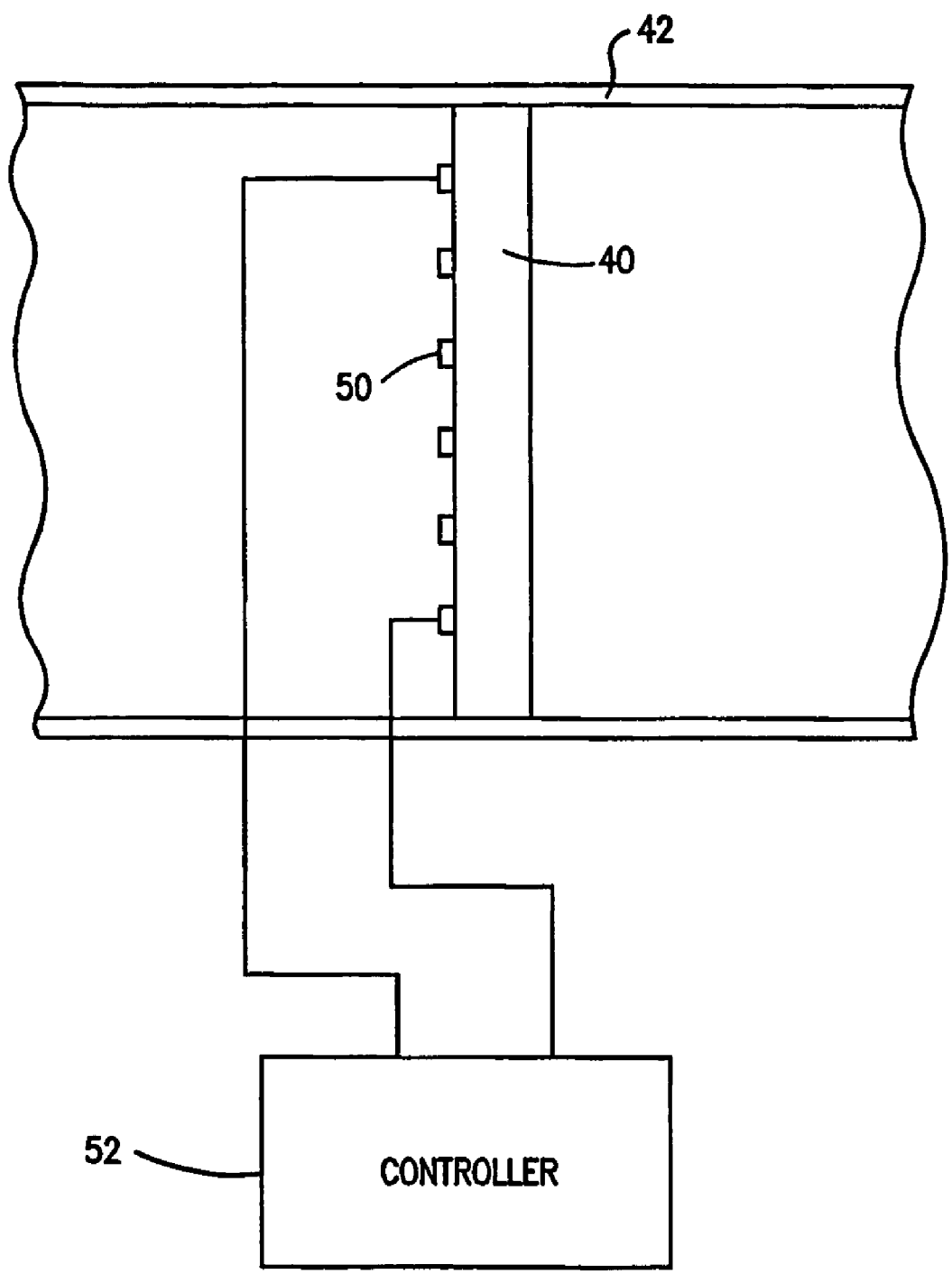
FIG. 1A is a simplified, partial cross-sectional diagram of the leak detection apparatus of FIG. 1, showing the permeable member.

Quartz, or silica glass, is an example of a material that is permeable to helium. In particular, the helium permeability of quartz varies with temperature. At elevated temperatures in the range of 300° C. to 900° C., quartz has a relatively high helium permeability. At room temperature, quartz has a relatively low helium permeability. As shown in FIG. 1A, the leak detection apparatus may be provided with a heating element 50 in thermal contact with quartz permeable member 40. The heating element heats the quartz material to increase helium permeability while the quartz selectively blocks most other gases, water vapor and particles. The quartz has a constant permeability for a given temperature. The temperature can be adjusted to control the permeability and therefore the sensitivity. Heating element 50 may be energized by a controller 52. By controlling the temperature of permeable member 40, a helium window is provided. At a relatively high temperature (e.g., 300° C. to 900° C.), helium permeability is high and the helium window is open. At a relatively low temperature (e.g., room temperature), helium permeability is low and the helium window is closed. Permeable member 40 may be heated by resistive heating, radiant heating, or any other suitable heating technique.

Permeable member 40 can be made of any suitable material that is permeable to the trace gas, typically helium, and may have any shape or dimension. Examples of suitable materials include quartz and permeable polymers such as tetrafluoroethylene, known under the trade name Teflon. The heating element is not required in the case of a permeable polymer. The permeable member can operate at vacuum, at atmospheric pressure or at a pressure slightly higher than atmospheric pressure. The permeable member can operate in an atmosphere that contains gases, particles and in wet environments.

In the embodiment of FIG. 1, vacuum pump 20 is utilized alone and is not part of a leak detector. In this embodiment, a fine leak test is not performed after a large leak test.

Figure 2:
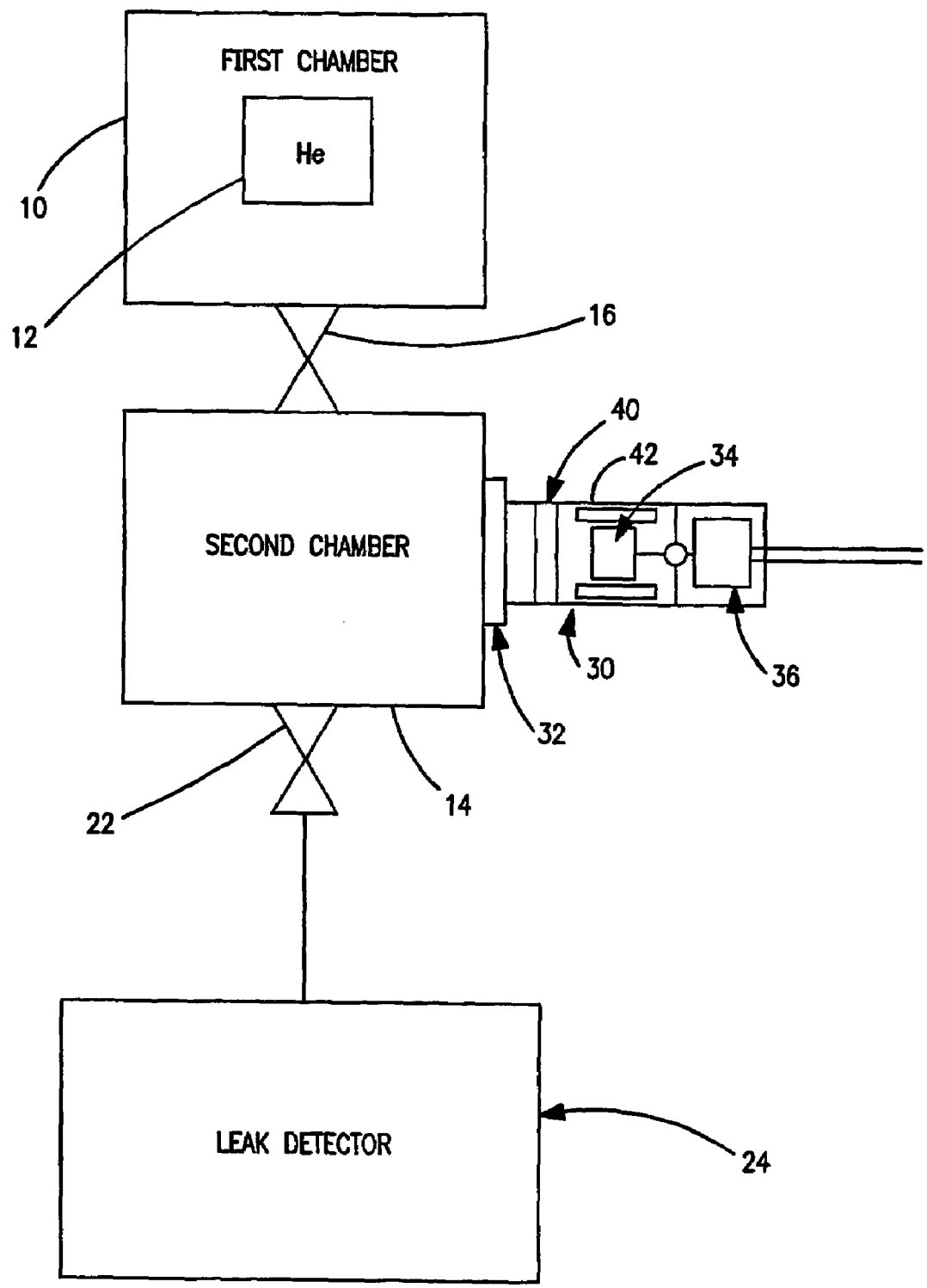
FIG. 2 is a schematic block diagram of leak detection apparatus in accordance with a second embodiment of the invention.
Figure 5:
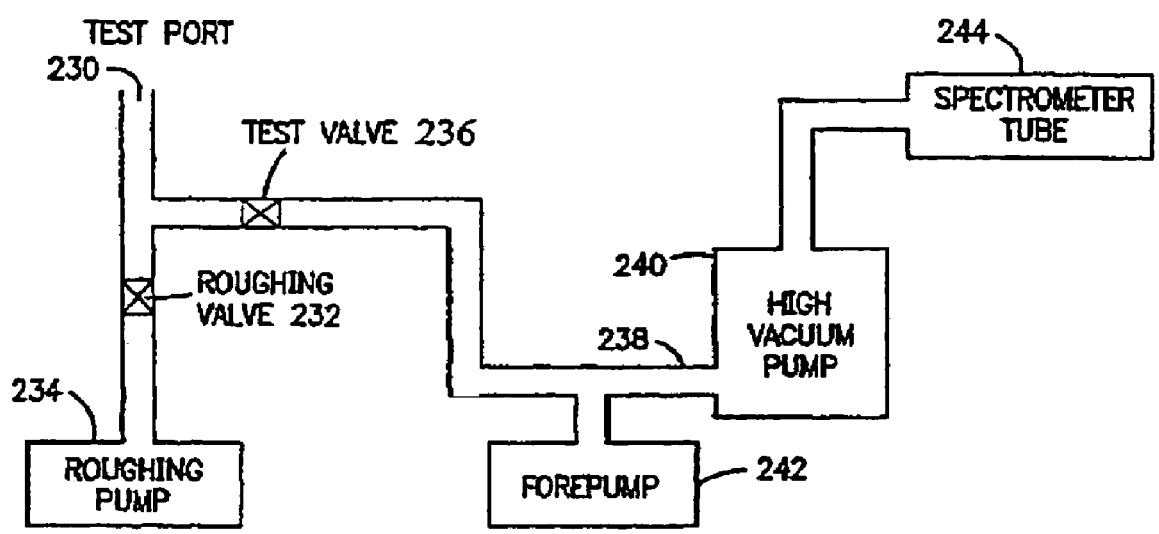
FIG. 5 is a schematic block diagram of a prior art leak detector.

A schematic block diagram of leak detection apparatus in accordance with a second embodiment of the invention is shown in FIG. 2. Like elements in FIGS. 1 and 2 have the same reference numerals. In the embodiment of FIG. 2, a test port of a leak detector 24 is connected through second valve 22 to second chamber 14. In the embodiment of FIG. 2, vacuum pump 20 is omitted and leak detector 24 includes a suitable vacuum pump that is connectable through valve 22 to second chamber 14. In this embodiment, a fine leak test may optionally be performed after the large leak test. Leak detector 24 may be any leak detector which includes a vacuum pump. An example of a suitable leak detector is shown in FIG. 5 and is described below. However, the leak detector is not limited to the example shown in FIG. 5.

Chambers 10 and 14 are interconnected by first valve 16, and vacuum pump 20 is connected to second chamber 14 through second valve 22. The helium detector assembly 30 is connected to second chamber 14. With first valve 16 closed to isolate chambers 10 and 14 from each other, the test piece 12 is placed in first chamber 10. At the beginning of the test, the helium concentration in first chamber 10 is at ambient level or alternately, a nitrogen flushing operation can be used to reduce the helium concentration in order to enhance sensitivity for the large leak measurement.

With first valve 16 closed, second valve 22 is opened to vacuum pump 20 so as to pump second chamber 14 to a desired vacuum level. Valve 22 is then closed so there is no vacuum pumping of either chamber. Valve 16 between chambers 10 and 14 is then opened, and the gas in chamber 10 is permitted to flow into chamber 14 until pressure equilibrium is achieved. Helium leaking from test piece 12 passes into second chamber 14 and increases the helium concentration in the vacuum environment until a pressure equilibrium is reached. The resulting helium concentration in second chamber 14 can now be measured.

Only helium passes through permeable member 40 and increases the pressure in ion pump 34. The increase in helium pressure produces an increase in ion pump current which is proportional to the increase in helium pressure and to the leak rate. The helium detector assembly 30 has essentially zero pumping speed in second chamber 14, except for helium that passes through permeable member 40, and does not remove gas from second chamber 14 as in the case of prior art devices. The helium detector assembly 30 detects the helium leak but does not pump the helium away, so large leaks are detected more accurately, more reliably and with more sensitivity than prior art methods.

In the embodiment of FIG. 1, the process is complete after measuring the ion pump current and determining the presence or absence of a large leak. In the embodiment of FIG. 2 where leak detector 24 is connected through second valve 22 to second chamber 14, the leak detector 24 can be utilized to detect a small leak if no large leak is detected by helium detector assembly 30. Second valve 22 is opened, and second chamber 14 is pumped to a pressure level suitable for operation of leak detector 24. The leak detector 24 is then utilized to detect the presence or absence of a small leak in test piece 12.

Figure 3:
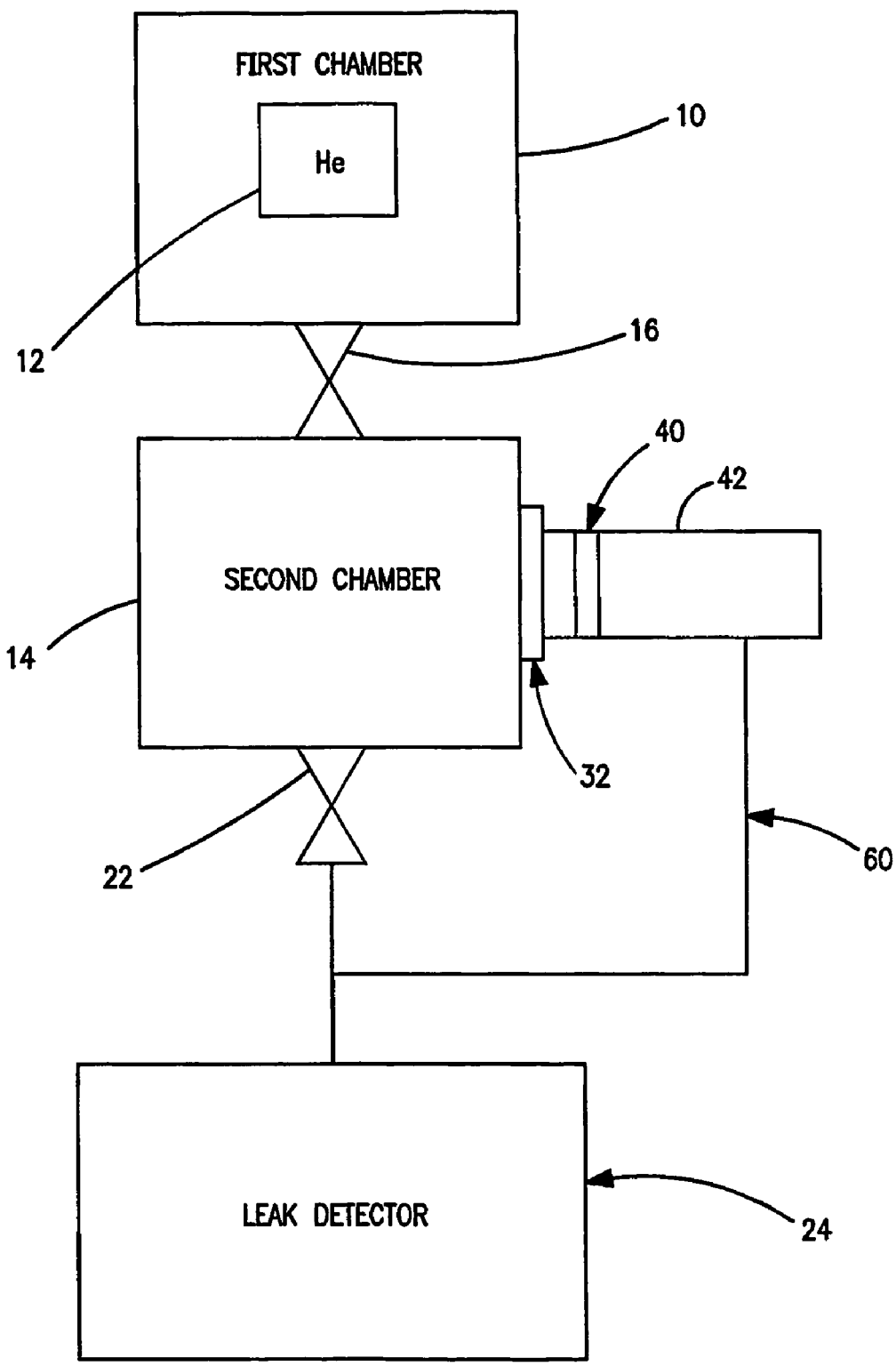
FIG. 3 is a schematic block diagram of leak detection apparatus in accordance with a third embodiment of the invention.

A schematic block diagram of leak detection apparatus in accordance with a third embodiment of the invention is shown in FIG. 3. Like elements in FIGS. 2 and 3 have the same reference numerals. In the embodiment of FIG. 3, ion pump 34 and ion pump controller 36 are omitted, and housing 42 is connected by a conduit 60 to the test port of leak detector 24.

To perform a large leak test, test piece 12 is placed in first chamber 10, and first valve 16 is closed. Second valve 22 is opened, and second chamber 14 is vacuum pumped with the vacuum pump that is part of leak detector 24. Then second valve 22 is closed and first valve 16 is opened. This allows the pressure to equalize between first chamber 10 and second chamber 14. Helium that leaks from test piece 12 passes through permeable member 40, housing 42 and conduit 60 to leak detector 24. The helium is detected by leak detector 24, and the presence or absence of a leak is determined. Because second valve 22 is closed during large leak detection, the pressure in second chamber 14 is maintained, except for the helium that passes through permeable member 40. As a result, helium is not rapidly pumped away and can be detected.

Figure 4:
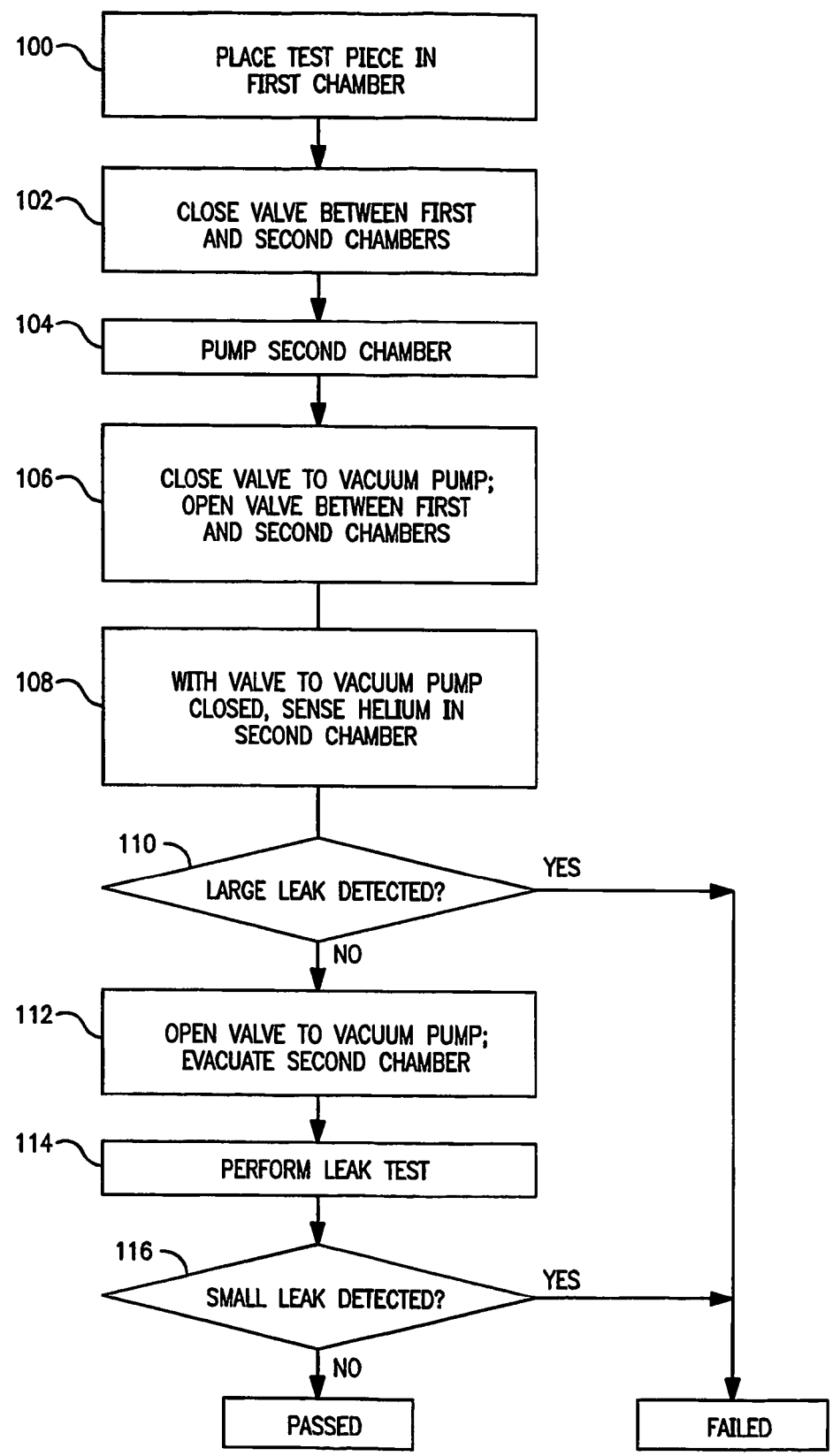
FIG. 4 is a simplified flow chart of a method for leak detection in accordance with an embodiment of the invention.

A simplified flow chart of a method for a leak detection in accordance with an embodiment of the invention is shown in FIG. 4. The method is described with reference to the leak detection apparatus shown in FIGS. 1-3 and described above. In step 100, test piece 12 is placed in first chamber 10. In step 102, valve 16 between first chamber 10 and second chamber 14 is closed. Then, valve 22 is opened, and second chamber 14 is vacuum pumped in step 104. In step 106, valve 22 is closed and valve 16 between the first and second chambers is opened. This allows the gas in first chamber 10 to expand into second chamber 14, thereby equalizing the pressure in the first and second chambers. If the apparatus includes heating element 50 as shown in FIG. 1A, the heating element maybe energized to increase the helium permeability of permeable member 40. In step 108, the helium in second chamber 14 is sensed with second valve 22 closed. In the embodiments of FIGS. 1 and 2, helium is sensed in step 108 by ion pump 34. In the embodiment of FIG. 3, helium is sensed in step 108 by leak detector 24. In step 110, a determination is made as to whether a large leak is present in test piece 12, based on the sensed helium that passes through permeable member 40. Large leak detection step 110 completes the process in the embodiment of FIG. 1. In the embodiments of FIGS. 2 and 3, valve 22 is opened in step 112 and second chamber 14 is vacuum pumped to a lower pressure level to permit small leak detection. In embodiments which include heating element 50 for heating permeable member 40, the heating element may be de-energized in step 112. In step 114, a leak test is performed by leak detector 24, and the presence or absence of a small leak is detected in step 116.

An example of a prior art leak detector suitable for use in the leak detection apparatus of FIGS. 2 and 3 is shown in FIG. 5. A test port 230 is coupled through a roughing valve 232 to a roughing pump 234. The test port 230 is also coupled through a test valve 236 to the foreline 238 of a high vacuum pump 240. Vacuum pump 240 may be a turbomolecular pump, a diffusion pump or a hybrid turbomolecular pump which includes axial pumping stages and molecular drag stages. The foreline 238 is also coupled to a forepump 242 which maintains the required operating pressure at the foreline 238. The inlet of vacuum pump 240 is coupled to the inlet of a mass spectrometer tube 244.

In operation, the roughing pump 234 initially evacuates the test port 230 and second chamber 14 to a pressure in the range of 100 to 300 millitorr. The test valve 236 is then opened and the helium tracer gas drawn in through the test port 230 passes in reverse direction through vacuum pump 240 to the spectrometer tube 244. Since the vacuum pump 240 has a much lower reverse flow rate for the heavier gases in the sample, it blocks these gases from spectrometer tube 244, thereby efficiently separating the tracer gas.

Having thus described various illustrative non-limiting embodiments, and aspects thereof, modifications and alterations will be apparent to those who have skill in the art. Such modifications and alterations are intended to be included in this disclosure, which is for the purpose of illustration and explanation, and not intended to define the limits of the invention. The scope of the invention should be determined from proper construction of the appended claims and equivalents thereof.

What is claimed is:

1. Apparatus for leak detection comprising:
   a first sealable chamber configured to receive a test piece containing a trace gas;
   a second sealable chamber;
   a first valve coupled between the first and second chambers;
   a leak detector having a test port, the leak detector comprising an ion pump;
   a trace gas permeable member coupled between the second chamber and the test port of the leak detector, the trace gas permeable member allowing the trace gas to pass and blocking other gases, liquids and particles;
   a vacuum pump having an inlet;
   a second valve coupled between the second chamber and the inlet of the vacuum pump; and a controller to control the permeable member at a high trace gas permeability at a first pressure of about 100 millitorr in the second chamber and to control the permeable member at a low trace gas permeability at a second pressure in the second chamber, which is lower then said first pressure and is suitable for operation of said leak detector.

2. Apparatus as defined in claim 1, wherein the permeable member is permeable to helium.

3. Apparatus as defined in claim 1, wherein the permeable member comprises a quartz member, the apparatus further comprising a heating element in thermal contact with the quartz member, wherein the controller is configured to control the heating element.

4. Apparatus for leak detection comprising:
   a first sealable chamber configured to receive a test piece containing a trace gas;
   a second sealable chamber;
   a first valve coupled between the first and second chambers;
   a leak detector including a test port and a vacuum pump;
   a second valve coupled between the second chamber and the test port of the leak detector;
   a trace gas permeable member coupled in parallel with the second valve between the second chamber and the test port of the leak detector, the trace gas permeable member allowing the trace gas to pass and blocking other gases, liquids and particles; and
   a controller to control the permeable member at a high trace gas permeability at a first pressure of about 100 millitorr in the second chamber and to control the permeable member at a low trace gas permeability at a second pressure in the second chamber, which is lower then said first pressure and is suitable for operation of said leak detector.

5. Apparatus as defined in claim 4, wherein the second valve is closed at relatively high pressures in the second chamber and wherein the second valve is open at relatively low pressures in the second chamber.

6. Apparatus as defined in claim 4, wherein the permeable member comprises a quartz member, the apparatus further comprising a heating element in thermal contact with the quartz member, wherein the controller is configured to control the heating element.

7. Apparatus as defined in claim 4, wherein the permeable member is permeable to helium.

8. A method for leak detection, comprising:
   providing a first sealable chamber, a second sealable chamber and a first valve coupled between the first and second chambers;
   placing a test piece containing a trace gas in the first chamber with the first valve closed;
   vacuum pumping the second chamber with the first valve closed;
   opening the first valve, wherein gas in the first chamber expands into the second chamber;
   providing a trace gas permeable member coupled to the second chamber, the trace gas permeable member allowing to trace gas to pass and blocking other gases, liquids and particles;
   detecting a leak in the test piece by sensing the trace gas that passed through the permeable member with an ion pump and monitoring ion pump current;
   vacuum pumping the second chamber with the first valve open, and sensing the trace gas pumped from the second chamber to provide detection of small leaks; and
   controlling the permeable member at a high trace gas permeability at a first pressure of about 100 millitorr in the second chamber and controlling the permeable member at a low trace gas permeability at a second pressure in the second chamber, which is lower then said first pressure and is suitable for operation of said leak detector.

9. The method as defined in claim 8, wherein controlling the permeable member comprises controlling heating of the permeable member.

10. Apparatus for leak detection comprising:
    a first sealable chamber configured to receive a test piece containing a trace gas;
    a second sealable chamber;
    a first valve coupled between the first and second chambers;
    a first leak detector including a test port and a vacuum pump;
    a second valve coupled between the second chamber and the test port of the first leak detector;
    a second leak detector having a test port, the second leak detector comprising an ion pump;
    a trace gas permeable member coupled between the second chamber and the test port of the second leak detector, the trace gas permeable member allowing the trace gas to pass and blocking other gases, liquids and particles; and
    a controller to control the permeable member at a high trace gas permeability at a first pressure of about 100 millitorr in the second chamber and to control the permeable member at a low trace gas permeability at a second pressure in the second chamber, which is lower then said first pressure and is suitable for operation of said leak detector.

11. Apparatus as defined in claim 10, wherein the second valve is closed at relatively high pressures in the second chamber and wherein said second valve is open at relatively low pressures in the second chamber.

12. Apparatus as defined in claim 10, wherein the permeable member comprises a quartz member, the apparatus further comprising a beating element in thermal contact with the quartz member, wherein the controller is configured to control the heating element.

13. Apparatus as defined in claim 10, wherein the permeable member is permeable to helium.

* * * * *

UNITED STATES PATENT AND TRADEMARK OFFICE
CERTIFICATE OF CORRECTION

PATENT NO. : 7,320,243 B2 Page 1 of 1
APPLICATION NO. : 10/524244
DATED : January 22, 2008
INVENTOR(S) : Perkins et al.

It is certified that error appears in the above-identified patent and that said Letters Patent is hereby corrected as shown below:

On the Title Page Item (75) "Inventors", please correct inventor name "Pieter N. Palenstijn" to read as follows:

--Pieter N. Palenstyn--

Signed and Sealed this

Twenty-seventh Day of May, 2008

JON W. DUDAS
*Director of the United States Patent and Trademark Office*